(12) United States Patent
Sun et al.

(10) Patent No.: US 9,107,260 B2
(45) Date of Patent: Aug. 11, 2015

(54) CURRENT RIPPLE CANCELING LED DRIVER

(71) Applicant: Shanghai Bright Power Semiconductor Co., Ltd., Shanghai (CN)

(72) Inventors: Shungen Sun, Shanghai (CN); Deshui Yu, Shanghai (CN); Liqiang Hu, Shanghai (CN)

(73) Assignee: Shanghai Bright Power Semiconductor Co., Ltd. (CN)

( * ) Notice: Subject to any disclaimer, the term of this patent is extended or adjusted under 35 U.S.C. 154(b) by 12 days.

(21) Appl. No.: 14/039,072

(22) Filed: Sep. 27, 2013

(65) Prior Publication Data

US 2014/0354186 A1 Dec. 4, 2014

(30) Foreign Application Priority Data

Jun. 4, 2013 (CN) .......................... 2013 1 0218482

(51) Int. Cl.
*H05B 33/08* (2006.01)
(52) U.S. Cl.
CPC .............................. *H05B 33/0815* (2013.01)

(58) Field of Classification Search
CPC .......... H05B 33/0815; H05B 33/0845; H05B 33/08; H05B 33/0809; H05B 37/00; H05B 37/02
USPC ............. 315/200 R, 224, 247, 276, 291, 307, 315/308, 310
See application file for complete search history.

(56) References Cited

U.S. PATENT DOCUMENTS

2010/0052569 A1\* 3/2010 Hoogzaad et al. ............. 315/294
2012/0181941 A1\* 7/2012 Kimura et al. ............ 315/200 R \* cited by examiner

*Primary Examiner* — Douglas W Owens
*Assistant Examiner* — Thai Pham
(74) *Attorney, Agent, or Firm* — Lerner, David, Littenberg, Krumholz & Mentlik LLP

(57) ABSTRACT

A current ripple canceling light-emitting diode (LED) driver is disclosed. The input current source contains a current ripple. The LED load is connected to the drain of a power switch. The source of the power switch is connected to a current sensing resistor. The gate of the power switch is connected to the output of an operational amplifier. The operational amplifier compares the voltage signal across the current sensing resistor with a dynamic reference voltage. The dynamic reference voltage is adjusted according to the gate or drain voltage of the power switch. The LED load current is controlled to be a nearly no ripple DC current.

9 Claims, 5 Drawing Sheets

SECOND EMBODIMENT

FIRST EMBODIMENT

NORMINAL OPERATION WAVEFORM

SECOND EMBODIMENT

FLYBACK EMBODIMENT

HIGH SIDE BUCK EMBODIMENT

LOW SIDE BUCK EMBODIMENT

BUCK-BOOST EMBODIMENT

CURRENT RIPPLE CANCELING LED DRIVER

CROSS-REFERENCE TO RELATED DOCUMENT

The present application claims priority from CN 201310218482.3 filed on Jun. 4, 2013 the disclosure of which is hereby incorporated herein by reference.

TECHNICAL FIELD

The present disclosure relates generally to Light-Emitting Diode (LED) supply and control circuits, and more specifically to current ripple canceling LED supply and control circuits. The first embodiment is designed for the second stage of an Active Power Factor Correction (APFC) LED driver.

BACKGROUND INFORMATION

FIG. 1 (Prior Art) is a diagram of one traditional LED driver circuit. An Active Power Factor Correction (APFC) LED driver 10 provides a constant current output for the LED load. The output current of the APFC LED driver 10 contains a ripple current, while its average current is regulated and kept constant.

The ripple current is usually twice the input AC line frequency, for example, if the line frequency is 60 Hz, the constant current output of APFC LED driver 10 contains a 120 Hz current ripple.

A filtering capacitor C1 filters the output current of the APFC LED driver 10 and reduces the ripple current in the LED load. However, since the ripple current frequency is low (120 Hz), even with a large size capacitor, the LED load current still contains a ripple current of 120 Hz frequency.

Since the LED load current contains a line frequency ripple, the luminance output of the LED lamp also contains a line frequency flicker. The line frequency flicker may interfere with video equipment such as cameras and video recorders.

SUMMARY OF THE INVENTION

A current ripple canceling light-emitting diode (LED) driver is disclosed. The input current source contains a current ripple. The LED load is connected to the drain of a power switch. The source of the power switch is connected a current sensing resistor. The gate of the power switch is connected to the output of an operational amplifier. The operational amplifier compares the voltage signal across the current sensing resistor with a dynamic reference voltage. The dynamic reference voltage is adjusted according to the gate or drain voltage of the power switch. The LED load current is controlled to be a nearly no ripple DC current.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
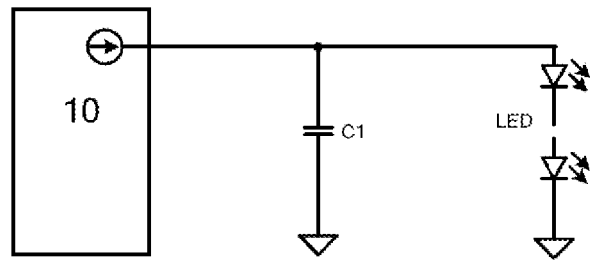
FIG. 1 (Prior Art) is a diagram of one traditional constant current LED driver circuit.
Figure 2:
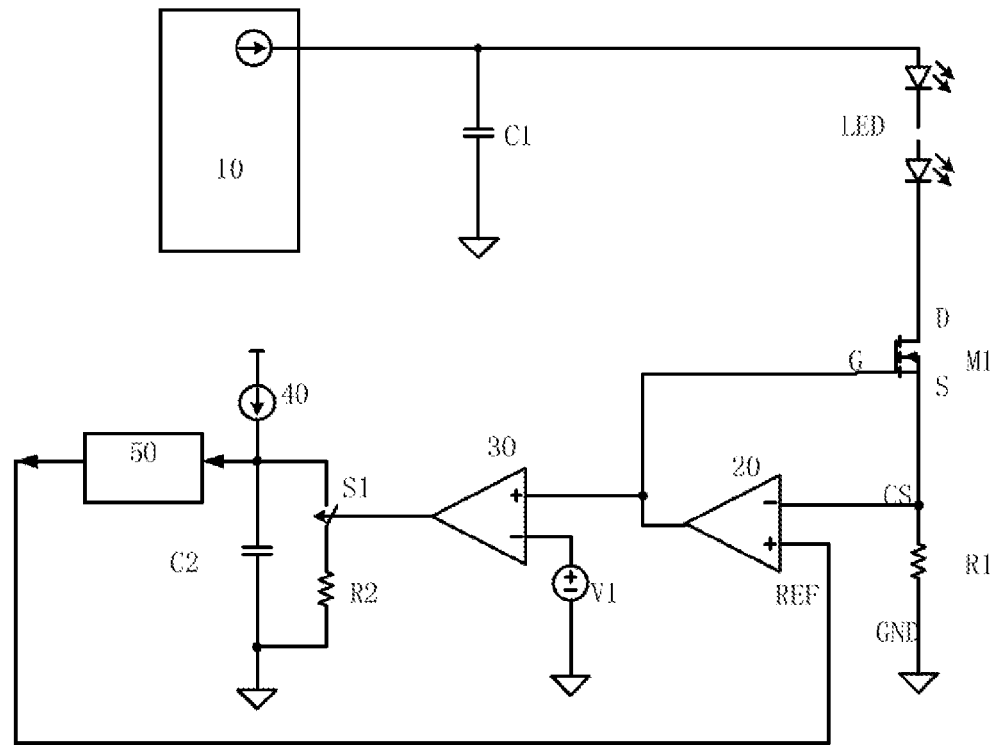
FIG. 2 is a diagram of a first embodiment of a current ripple canceling LED driver in accordance with the novel aspect.

FIG. 2 is a circuit diagram of a current ripple canceling LED driver in accordance with a first embodiment. In the embodiment, the input current source comes from a first stage LED driver, such as an Active Power Factor Correction (APFC) converter. The first stage LED driver delivers a constant input current to the current ripple canceling LED driver. The input current source contains a current ripple that need to be eliminated in the LED load by the disclosed circuits.

A filtering capacitor C1 is implemented. The filtering capacitor C1 is connected between the input current source and the system ground. The positive terminal of the LED load is connected to the positive node of the filtering capacitor C1. The LED load could be a number of series-connected or parallel-connected LEDs.

A power switch M1 is implemented. The drain D of the power switch M1 is connected to the negative terminal of the LED load. The power switch M1 could be a Metal-Oxide-Semiconductor Field-Effect Transistor (MOSFET) or a Bipolar Junction Transistor (BJT). Although the MOSFET device is illustrated here, it is appreciated that other types of transistors may be used as well.

A current sensing resistor R1 is implemented. The source S of the power switch M1 is connected to the current sensing resistor R1. The current sensing resistor R1 senses the information of the LED load current. The voltage across the current sensing resistor is proportional to the LED load current.

An operational amplifier 20 is implemented. The negative input of the operational amplifier 20 is connected to the current sensing resistor R1. The positive input of the operational amplifier 20 is connected to a dynamic reference voltage REF. The output of the operational amplifier 20 is connected to the gate G of the power switch M1.

A comparator 30 is implemented. One input terminal of the comparator 30 is connected to the gate G of the power switch M1. Another input terminal of the comparator 30 is connected to a threshold voltage V1. The output of the comparator is connected to a discharge switch S1.

A dynamic reference generating circuit is implemented. The discharge switch S1 is in series with a discharge circuit R2. An integrating capacitor C2 is connected to the discharge switch S1 and the discharge circuit R2. A charge circuit 40 is connected to the integrating capacitor C2. The charge circuit 40 is usually a current source or a resistor. The voltage on the integrating capacitor C2 is scaled by the proportional convertor 50. The output of the proportional convertor 50 is the dynamic reference voltage REF and is fed into the positive input of the operational amplifier 20.

Figure 3:
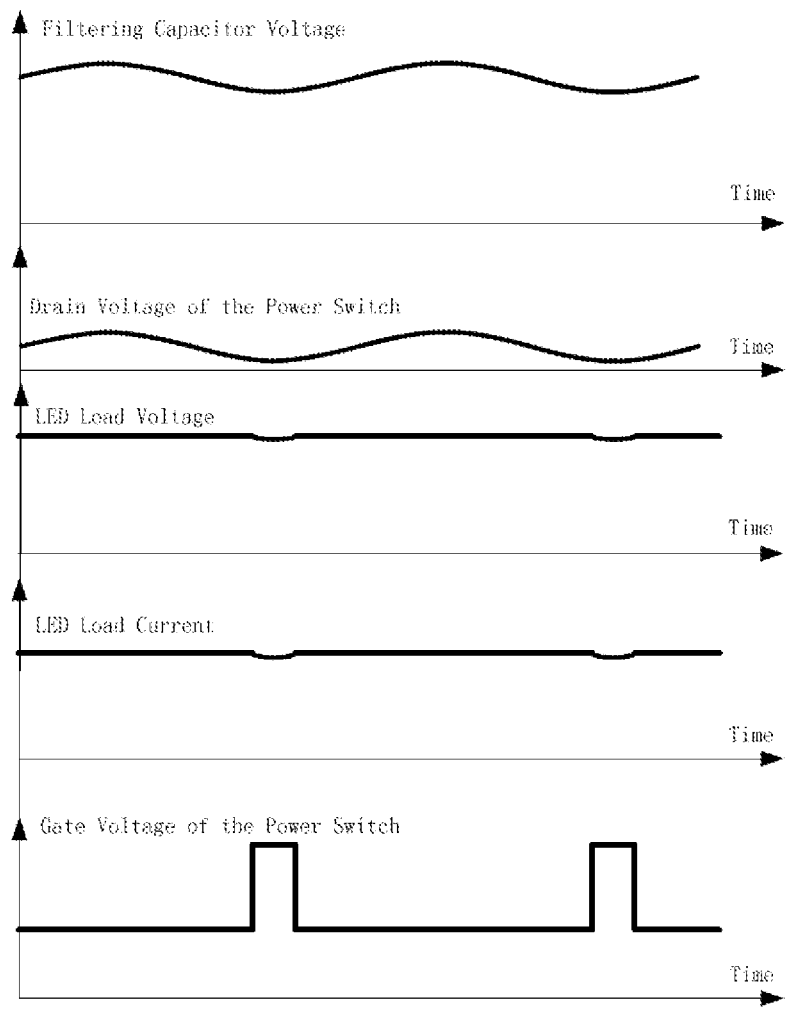
FIG. 3 is a waveform diagram that illustrates the operation of the current ripple canceling LED driver of FIG. 2

FIG. 3 is a waveform diagram that illustrates the operation of the current ripple canceling LED driver. The input current source contains a current ripple. For example, the first stage APFC LED driver delivers a current source containing a current ripple with twice of the AC line frequency. The filtering capacitor C1 stores the ripple current of the input current source and a ripple voltage is established on the filtering capacitor C1.

The current in the LED load flows into the drain D of the power switch M1 and flows out from the source S of the power switch M1. The current in the current sensing resistor R1 is equal to the current in the LED. The voltage CS on the current sensing resistor is proportional to the LED load current. The operational amplifier 20 compares the voltage CS and the dynamic reference voltage REF. The output of the operational amplifier 20 controls the gate G voltage of the power switch M1.

Since the LED load voltage drop is almost constant, the drain D voltage of the power switch M1 also contains a voltage ripple. When the drain D voltage of the power switch M1 is higher than the dynamic reference voltage REF, the LED load current is closed loop regulated. The LED load current is a flat shape current without ripple. The LED load current is $$I_{LED} = \frac{V_{ref}}{R_{CS}},$$

where $V_{ref}$ is the dynamic reference voltage and $R_{Cs}$ is the value of the current sensing resistor R1. When the drain D voltage is lower than the dynamic reference voltage REF, the above loop cannot be closed, the output of the operation amplifier 20 will saturate, the gate G voltage of the power switch M1 will increase, and the LED load current will be less than $$\frac{V_{ref}}{R_{CS}}.$$

The gate G voltage of the power switch M1 is fed into the comparator 30. The comparator 30 compares the gate G voltage of the power switch M1 with the threshold voltage V1. When the gate G voltage is higher than the threshold voltage V1, it means the LED load current is less than $$\frac{V_{ref}}{R_{CS}},$$

and it indicates that the LED load current is no longer flat and current ripple occurs. At this time, the comparator 30 turns on the discharge switch S1, the integrating capacitor C2 voltage and dynamic reference voltage REF decrease, and the LED load current is reduced. Since the average value of the input current of the LED driver is a constant, when the LED load current is reduced, the average input current is higher than the LED load current, and the average voltage of the filtering capacitor and the average voltage of drain D of the power switch M1 increases.

When the average voltage of drain D of the power switch M1 is higher, the on-time of the discharge switch S1 is reduced, and the average discharge current of the integrating capacitor C2 is reduced. Thereafter, the integrating capacitor C2 voltage, dynamic reference voltage REF, and LED load current increases. When the average LED load current is higher than the average input current, the average voltage of filtering capacitor C1 decreases, and the average voltage of drain D is reduced. A slow voltage loop is closed resulting in the average LED load current to be equal to the average input current, and resulting in the drain D voltage of the power switch M1 to be higher than the dynamic reference voltage REF for a majority of the time. The LED load current is an almost flat waveform, and the drain D voltage of the power switch M1 is as low as possible, minimizing the power loss on the power switch M1.

In other words, there is a fast current loop and a slow voltage loop. The fast current loop is formed by the operational amplifier 20, current sensing resistor R1 and power switch M1 resulting in a flat LED load current when drain D voltage of the power switch is sufficient. The slow voltage loop is formed by the comparator 30, discharge switch S1, discharge circuit R2, charge circuit 40, integrating capacitor C2 and proportional convertor 50, allowing the drain D voltage of the power switch to be sufficient for a majority of the time.

In the embodiments, the charge circuit 40 could be a current source or a resistor. Discharge switch S1 could be a transistor or a controlled current source. Discharge circuit R2 could be a resistor or a current source. The place of the discharge switch S1 and the discharge circuit R2 can be interchanged. The proportional convertor 50 can also be omitted.

Figure 4:
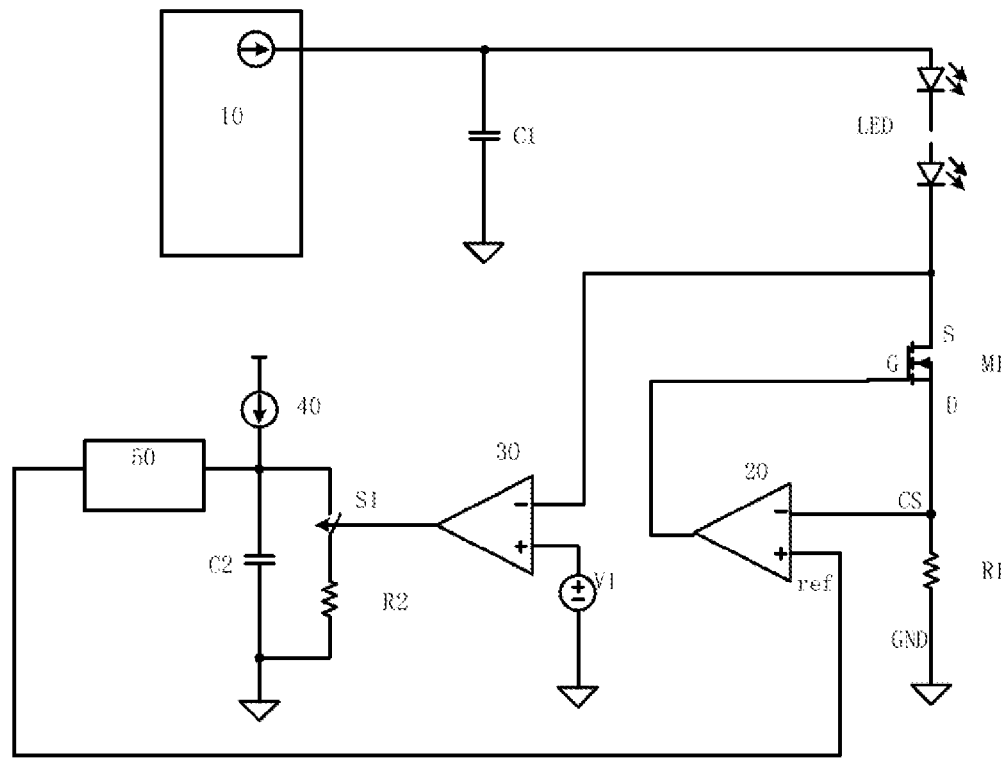
FIG. 4 is a diagram of a second embodiment of the current ripple canceling LED driver in accordance with the novel aspect.

FIG. 4 is a diagram of a second embodiment of the disclosed current ripple canceling LED driver. The difference between the second embodiment and first embodiment is that the input signal of the comparator 30 is changed to the drain D voltage of the power switch M1. When the drain D voltage is lower than the threshold V1, the dynamic reference voltage REF and LED load current is reduced, thereby increasing the average voltage of the filtering capacitor C1 and increasing the average voltage of the drain D of the power switch M1. The voltage loop can be closed to make the LED load current almost flat and to minimize the power loss of the power switch M1.

Figure 5:
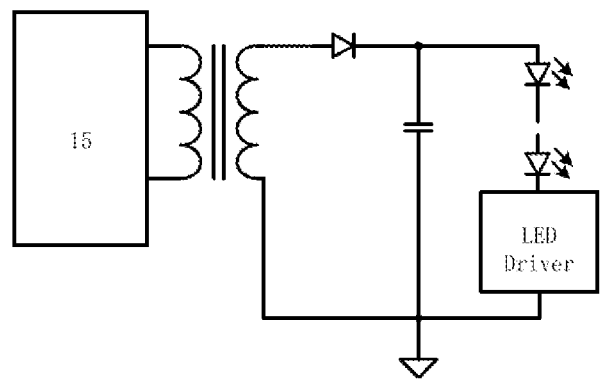
FIG. 5 is a diagram of a flyback structure embodiment of the current ripple canceling LED driver

FIG. 5 is the flyback structure embodiment of the disclosed current ripple canceling LED driver together with the first stage flyback convertor 15.

Figure 6:
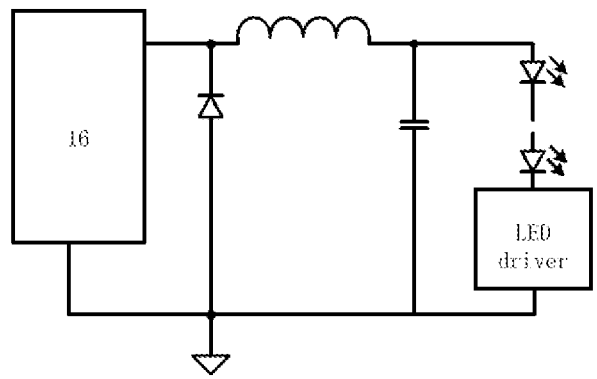
FIG. 6 is a diagram of a high side buck structure embodiment of the current ripple canceling LED driver

FIG. 6 is the high side buck structure embodiment of the disclosed current ripple canceling LED driver together with the first stage high side buck convertor 16.

Figure 7:
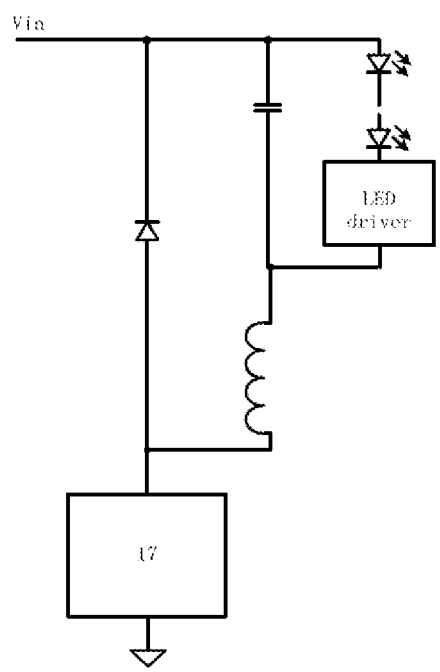
FIG. 7 is a diagram of a low side buck structure embodiment of the current ripple canceling LED driver

FIG. 7 is the low side buck structure embodiment of the disclosed current ripple canceling LED driver together with the first stage low side buck convertor 17.

Figure 8:
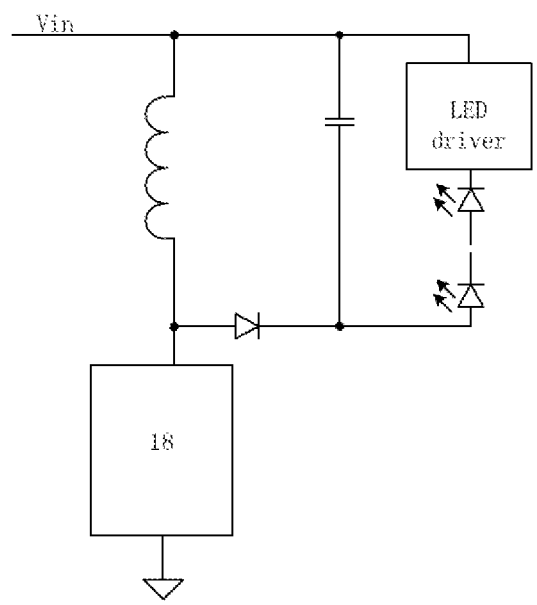
FIG. 8 is a diagram of a buck-boost structure embodiment of the current ripple canceling LED driver

FIG. 8 is the buck-boost structure embodiment of the disclosed current ripple canceling LED driver together with the first stage buck-boost convertor 18.

Although specific embodiments have been illustrated and described, it will be appreciated by those skilled in the art that various modifications may be made without departing from the scope of the present invention.

What is claimed is:

1. A current ripple canceling LED driver, comprising: an input source, a filtering capacitor and an LED load, characterized in that,
the LED load is connected to a power switch, the source of the power switch is connected to a current sensing resistor, the gate of the power switch is connected to the output of an operational amplifier,
wherein the input source is a current source containing a current ripple, the operational amplifier compares the voltage signal across the current sensing resistor with a dynamic reference voltage, the dynamic reference voltage being a voltage signal of an integrating capacitor, and the power switch is controlled to regulate the LED load current to be a nearly no ripple DC current.

2. The current ripple canceling LED driver of claim 1, characterized in that the gate or drain voltage of the power switch is compared with a threshold voltage by a comparator, the output of the comparator controls a discharge switch, and when the discharge switch is turned on, the integrating capacitor voltage and dynamic reference voltage decreases.

3. The current ripple canceling LED driver of claim 1, characterized in that the integrating capacitor is connected to a charge circuit, the charge circuit is a current source or a resistor.

4. The current ripple canceling LED driver of claim 2, characterized in that the discharge switch is in series with the discharge circuit, and the integrating capacitor is paralleled with the discharge switch and the discharge circuit.

5. The current ripple canceling LED driver of claim 4, characterized in that the place of the discharge switch and the discharge circuit can be interchanged, the discharge circuit is a resistor or a current source.

6. The current ripple canceling LED driver of claim 1, characterized in that the dynamic reference voltage is a proportional scaled voltage signal of the integrating capacitor.

7. The current ripple canceling LED driver of claim 1, characterized in that the input source is one of a flyback switching convertor, a buck switching convertor, or a buck-boost switching convertor.

8. The current ripple canceling LED driver of claim 1, characterized in that the power switch is one of a Metal-Oxide-Semiconductor Field-Effect Transistor (MOSFET) or a Bipolar Junction Transistor (BJT).

9. The current ripple canceling LED driver of claim 8, wherein the driving signal of the power switch is a current signal when the power switch is a BJT.

* * * * *